(12) United States Patent
Bitter

(10) Patent No.: US 7,753,385 B2
(45) Date of Patent: Jul. 13, 2010

(54) SUSPENSION SYSTEM

(75) Inventor: Marcus Bitter, Mannheim (DE)

(73) Assignee: Deere & Company, Moline, IL (US)

( * ) Notice: Subject to any disclaimer, the term of this patent is extended or adjusted under 35 U.S.C. 154(b) by 460 days.

(21) Appl. No.: 11/866,757

(22) Filed: Oct. 3, 2007

(65) Prior Publication Data

US 2008/0088107 A1    Apr. 17, 2008

(30) Foreign Application Priority Data

Oct. 14, 2006    (DE) .................. 10 2006 048 662

(51) Int. Cl.
  *B60G 11/30*    (2006.01)
(52) U.S. Cl. .................. 280/124.161; 280/124.106
(58) Field of Classification Search .......... 280/124.161, 280/124.16, 124.159, 124.106; 267/64.11
  See application file for complete search history.

(56) References Cited

U.S. PATENT DOCUMENTS

| | | | | |
|---|---|---|---|---|
| 2,684,254 | A * | 7/1954 | Goss | 280/5.508 |
| 3,871,635 | A * | 3/1975 | Unruh et al. | 267/187 |
| 4,095,822 | A * | 6/1978 | Thornhill | 267/64.11 |
| 4,483,409 | A * | 11/1984 | Fun | 180/89.15 |
| 4,827,416 | A * | 5/1989 | Kawagoe et al. | 701/38 |
| 5,040,823 | A * | 8/1991 | Lund | 280/5.502 |
| 5,443,283 | A * | 8/1995 | Hawkins et al. | 280/124.157 |
| 5,584,498 | A * | 12/1996 | Danek | 280/5.503 |
| 6,477,455 | B2 * | 11/2002 | Panizzolo | 701/37 |
| 6,517,094 | B1 * | 2/2003 | Kincaid et al. | 280/124.106 |
| 7,055,831 | B2 * | 6/2006 | Brandenburger | 280/5.504 |
| 7,192,034 | B2 * | 3/2007 | Radke et al. | 280/6.159 |
| 7,584,812 | B2 * | 9/2009 | Radke et al. | 180/9.54 |
| 2004/0113377 | A1 | 6/2004 | Klees | |

FOREIGN PATENT DOCUMENTS

| | | |
|---|---|---|
| DE | 197 21 759 | 11/1998 |
| DE | 100 43 053 | 4/2002 |
| DE | 103 47 125 | 5/2005 |
| GB | 2 337 730 | 12/1999 |
| WO | WO 90/10551 | 9/1990 |

OTHER PUBLICATIONS

European Search Report, Jan. 23, 2008, 4 Pages.
European Search Report, Aug. 14, 2007, 3 Pages.

* cited by examiner

*Primary Examiner*—Paul N. Dickson
*Assistant Examiner*—Timothy Wilhelm

(57) ABSTRACT

A suspension system for an agricultural or construction industry vehicle is described. The suspension system comprises two hydraulic cylinders which support a frame in relation to an axle of the vehicle, the hydraulic cylinders being hydraulically connected to one another in a cross connection, so that a piston-side chamber of the one hydraulic cylinder is connected to the piston rod-side chamber of the other hydraulic cylinder and vice versa, in each case one hydraulic accumulator assigned to a hydraulic cylinder, a hydraulic source, a hydraulic tank, a control valve device, an electronic control unit, electrically switchable switch valves which are arranged in the cross connection between the hydraulic accumulators and the hydraulic cylinders, and a first and second supply line, which supply lines connect the control vale device to the cross connection. In order to prevent the activation of a suspension state in critical vehicle states, means for the detection and compensation of load states of the vehicle are provided in the suspension system.

18 Claims, 8 Drawing Sheets

SUSPENSION SYSTEM

FIELD OF THE INVENTION

The invention relates to a suspension system for an agricultural or construction vehicle. More particularly the invention relates to suspension system for a loader vehicle.

BACKGROUND OF THE INVENTION

Suspension systems in which the front axle is hydro-pneumatically sprung are known in agricultural vehicles, such as tractors. Front axle suspension affords the driver greater ride comfort and increased working efficiency, since both the speed of travel and the traction of the vehicles can be significantly increased compared to unsprung vehicles. The hydraulic design configuration of such a front axle suspension generally comprises hydraulic accumulators, which are connected to hydraulic cylinders arranged on the front axle, which in turn connect a vehicle frame to the front axle. In such vehicles the front axle is embodied as a fully floating axle, so as to provide a sprung suspension. Such vehicles furthermore have a rigid rear axle, in order to counter the risk of rolling movements or even overturning of the vehicle. The use of a floating rear axle is therefore not advisable with such suspension systems for only sprung front axles.

Agricultural vehicles are also known, which have both a sprung floating front axle and sprung wheel suspensions. Such vehicles are known, for example, in the form of John Deere, 8000-series tractors. In these the problem of rolling movements or a lateral tipping of the frame of the vehicle is resolved in that a hydraulic interconnection is made between the rod side of the suspension cylinders of one side of the rear axle and the piston side of the opposing suspension cylinder. The advantage of this interconnection is that a mechanical roll stabilizer can be dispensed with, since when one suspension cylinder is compressed, the opposing suspension cylinder is bound to be likewise retracted due to the increasing pressure on its rod side. In this way, rolling movements can to a certain extent be suppressed. An uneven loading of the vehicle, which would lead to tipping of the frame, can be compensated for by different pressures of the hydraulic accumulators contained in the suspension system. Such a suspension system, however, cannot be used on vehicles that do not have hydraulic cylinders on a floating rear axle.

In the case of loader vehicles, the front axle is generally designed as a rigid axle and the rear axle is floating. The reason for this is that the payload of a loader vehicle is primarily situated in front of the front axle, for which reason a greater stiffness is required in this area, in order to prevent the vehicle overturning. A suspension system for such a loader vehicle is also known and is used, for example, on the Turbofarmer 'P41.7 Top' produced by Merlo and marketed under the name 'EAS'—Electronic Active Suspension. The suspension system produced by Merlo comprises a front axle suspended on two hydraulic cylinders, the hydraulic cylinders being connected to hydraulic accumulators and the hydraulic cylinders and hydraulic accumulators being correspondingly controlled by an electronic control unit according to the attitude of and forces acting on the vehicle. The rear axle is in this case floating, affording both a suspension function for the front axle and a correction of the tilting of the vehicle frame. A roll stabilization implemented in the electronic control unit is intended to ensure that the vehicle always remains in a horizontal position. The roll stabilization is however of complex design and has possibilities for improvement, by means of which the driving comfort for an operator can be optimized.

SUMMARY OF THE INVENTION

According to the invention a suspension system of the aforementioned type is provided with means for the detection and compensation of load states on the suspension system. The means for the detection and compensation of load states on the suspension system allow it to be determined, before the suspension is activated, whether the vehicle is in an unsafe load state. On activation of the suspension system and/or the suspension control system, the static states on the vehicle are fundamentally altered. Whereas with the suspension deactivated the vehicle is stable, on activation of the suspension the support width of the vehicle is reduced, with the result that forces may be introduced, which can cause the vehicle to overturn. Such forces may be caused, for example, by eccentric loading or inclined positions of the vehicle. The reduction in the support width occurs precisely at the moment at which the frame of the vehicle is resiliently supported on the hydraulic cylinders. Instead of the track width of the vehicle, which is available as support width when the suspension is deactivated, with the suspension activated only the distance between the attachment points of the hydraulic cylinders is available to hold a possible overturning moment. If an overturning moment were too great, a tensile force would occur on one of the hydraulic cylinders, which would pull the hydraulic cylinder completely apart, whilst the other hydraulic cylinder would be compressed and would serve as tipping point. Such a tipping movement would occur very rapidly on sudden activation of the suspension and in an extreme case would lead to overturning of the entire vehicle. The means for the detection and compensation of load states serve to avoid situations in which the suspension can be activated whilst critical load states prevail, since the state of the vehicle is analysed, that is to say detected, before activation of the suspension, and if a critical load state prevails an activation of the suspension is not permitted. By purposely controlling the hydraulic cylinders, it is possible to compensate for critical load states, so that non-critical load states can be established on activation of the suspension.

The means for the detection and compensation of load states may comprise pressure transducers and means for registering the position of a pressure transducer, the pressure transducers in each case being arranged between the first and second chambers of each hydraulic cylinder. The pressure transducers constitute hydraulically compensated load case detectors, situated on both hydraulic cylinders. The pressure transducers serve to detect whether a load is pulling on one of the two rods of the hydraulic cylinders. If this is the case, a pressure change will occur on the rod side of the hydraulic cylinder affected. Detecting this pressure change is not without problems, since a constrained pressure may be present in the hydraulic cylinder, which has resulted due to external heating or an adjustment of the hydraulic cylinder, for example. Pressure transducers are used in order to compensate for this constrained pressure.

In a preferred embodiment of the invention, pressure transducers are used, of which the area ratio of pressure-generating areas in the chambers is substantially equal to the area ratio of the pressure-generating areas in the chambers of the respective hydraulic cylinder. If this condition is fulfilled and no external force is acting on the hydraulic cylinder, a constrained pressure in the hydraulic cylinder will be compensated for, since the piston rod of the hydraulic cylinder and the pressure transducer piston will each move into a position of equilibrium of forces. If necessary, this may be supported on the pressure transducer by weak centring springs, in order to suppress any friction effects. At the instant when an external force acts on the piston rod of the hydraulic cylinder, the pressure equilibrium is upset and the piston of the pressure transducer changes its position. If a positive force acts on the piston rod of the hydraulic cylinder, the piston-side pressure of the hydraulic cylinder increases and the piston of the pressure transducer is forced upwards. At the same time a positive force means that some of the weight of the frame rests on this piston rod of the hydraulic cylinder. If a negative force acts on the piston rod, the rod-side pressure of the hydraulic cylinder increases and the piston of the pressure transducer is forced downwards. In this case a negative force means that the frame does not rest on the cylinder rod, but instead is pulling on it, which when the rod-side switch valve opens could lead to an extending of the piston rod of the hydraulic cylinder and hence to a tilting of the frame.

In a preferred embodiment of the invention, the means for registering the position of a pressure transducer comprise a switch or sensor. Since the direction of the force acting on the hydraulic cylinder can be determined from the position of the piston of a pressure transducer described above, such a pressure transducer is used and the position of the piston is determined by means of a switch or sensor. The precise form of the sensor or switch may vary greatly and will not be described in further detail here. For safety reasons, however, it is advisable for a switch to be designed as a normally open contact, so that any misinterpretation in the event of a cable break is excluded. It is important for the piston of the pressure transducer to be sealed leak-tight, so that no oil can flow from one side of the hydraulic cylinder to the other. t is important that the variable volume of the pressure transducer is not too great, so that uncontrollable movements of the frame cannot occur.

In another exemplary embodiment, the means for the detection and compensation of load states may comprise pressure sensors, capable of registering the pressure in the individual chambers of the first and second hydraulic cylinders. The function of the pressure sensors is to replace the functions of the pressure transducers described above by switches, the pressures prevailing in the hydraulic cylinder chambers being measured and evaluated with regard to the direction of the forces acting on the piston rod off the hydraulic cylinder. The compensation for any constrained pressure would therefore be electronically or computer-controlled.

The means for the detection and compensation of load states may further comprise pressure switches, each connected to a chamber of a hydraulic cylinder, the rod-side chamber, in a hydraulic cylinder arrangement in which the frame normally exerts a load on the piston side of the hydraulic cylinder being connected to the pressure switch (an inverse arrangement of the hydraulic cylinders can obviously be used here and also in the examples already mentioned, the pressure switch then being connected to the rod-side chamber). Should a specific pressure, which can be generated only by a tensile force on the piston rod, now be exceeded on the rod side, the pressure switches close, or better still, open and the state is detected as being unsafe for the vehicle. It is naturally also feasible for pressure sensors to assume the functions of the pressure switches. Since constrained forces are not detected directly as such by the pressure switches, the load case sensing is not as precise as with pressure sensors or pressure transducers, for which reason an additional safety margin should be allowed here.

As a further example, the means for the detection and compensation of load states may comprise force sensors, which serve indirectly or directly to detect forces acting on the hydraulic cylinders. A direct measurement, here, for example, would measure the bearing forces of the articulation points of the suspension cylinders or the tensile forces acting on the cylinder rod. An indirect measurement can be performed by measuring the flexure or torsion of different areas of the axle or the frame, and inferring the load state of the vehicle from this.

The switch valves are preferably embodied in such a way that they have a flow position and a closed position, the closed position comprising a non-return valve opening in the direction of the chamber. The switch valves are arranged between each chamber of the hydraulic cylinders and the correspondingly assigned hydraulic accumulator, so that the connection of each chamber to one of the hydraulic accumulators, or the connection of two opposite chambers (rod-side chamber of the one hydraulic cylinder to the piston-side chamber of the other hydraulic cylinder), can be controlled individually. If the switch valve is in its open position in this case, a hydraulic flow can ensue in both directions of the connecting line. If the switch valve is in the closed position, a discharge out of the correspondingly assigned chamber of the hydraulic cylinder is prevented.

Alternatively, the switch valves can also have a through-flow position and a closed position, which closes in both directions, and be connected in parallel with a non-return valve which opens in the direction of the chamber, so that hydraulic fluid can always flow in the direction of the chamber, but conversely no hydraulic fluid can flow out of the hydraulic chamber when the switch valve is in the closed position.

The connecting lines are preferably also provided with pressure switches. The pressure switches, in the event of a pressure drop due to a broken hose, for example, allow this to be detected and cause the switch valves to switch to their closed position, so that no hydraulic fluid can escape from the chambers of the hydraulic cylinder. In order to prevent the frame subsiding due to a broken hose or pipe, the switch valves assigned to a hydraulic cylinder must be fitted in such a way that there are no connecting elements in the form of hoses between these components. The hydraulic accumulators can in each case be arranged anywhere between the switch valves on the respective one piston rod side of the one hydraulic cylinder and the piston side of the other hydraulic cylinder, and arranged between the switch valves of the respective piston rod side and the piston side.

The control valve device preferably comprises a first admission line opening into the one supply line and a second admission line opening into the other supply line, and a first discharge line opening into the one supply line and a second discharge line opening into the other supply line, the admission lines being connectable via admission control valves to the hydraulic pump or the hydraulic tank, and the discharge lines being connectable via discharge control valves to the hydraulic tank. The admission into the piston side of the one hydraulic cylinder and the admission into the piston rod side of the other hydraulic cylinder therefore occurs via the one admission control valve and the admission into the chambers of the in each case other hydraulic cylinder occurs via the other admission control valve. The same likewise applies to the discharge via the discharge control valves.

The admission control valves and/or the discharge control valves preferably comprise switch valves, the admission control valves being embodied as 3/2-way valves and the discharge control valves as 2/2-way valves. A control position of each of the discharge control valves comprises a leak-tight non-return valve closing in the direction of the hydraulic tank, the other control position preferably constituting a flow position in both ducting directions. The control valve device hitherto represented basically fulfils all necessary functions, the volumetric flows, if necessary, being furthermore electronically controllable by means of flow control valves.

In another embodiment the admission control valves and/or the discharge control valves may comprise proportional valves. Proportional valves allow the hydraulic cylinders to be controlled with adjustable volumetric flows independently of one another. This can be particularly advantageous during the loading operation, in order that the hydraulic cylinders can be extended more or less uniformly and simultaneously. It is also advantageous that the load state compensation already mentioned can be performed smoothly. This leads to improvements in the ride comfort and the driving safety. The main difference in the use of proportional valves compared to the ON/OFF-switch valves is that the two switch valves in the admission line are replaced by proportional valves and a proportional valve has been added in each of the two discharge lines. A leak-tight switch valve is usually necessary in the discharge line in order to maintain the safeguard against broken hoses, since proportional valves are generally not leak-tight. It is obviously feasible here, as also in the preceding embodiments, for the leak-tight switch valves to be replaced by resettable non-return valves, which are controlled by suitable means. It is only important that the connection can be sealed leak-tight and opened as necessary.

In order to make the supply to the suspension system vary as a function of the pressure, a load-sensing device is provided, which detects a pressure in the first or second admission line. The load-sensing device extends between the admission lines and a hydraulic oil supply, for example an adjustable hydraulic oil pump, the load-sensing device being provided with a shuttle valve, so that the highest pressure in the respective admission line is always signalled to the hydraulic oil supply. This load-sensing device may be used both in embodiments of the control valve device with switch valves and in that with proportional valves.

For pressure relief of the load-sensing device in the neutral position and to provide a safeguard against broken pipes or hoses, the admission lines may be provided with a non-return valve opening in the direction of the supply lines.

The discharge lines are preferably provided with a restrictor or orifice. The restrictors or orifices ensure that the oil cannot flow too rapidly out of the chambers of the hydraulic cylinders, so that the process remains manageable. It would also be feasible to use suitable switch valves, or to use flow control valves upstream or downstream of the discharge control valves.

In a preferred embodiment of the invention the piston-side and the piston rod-side chambers of the hydraulic cylinders may each be provided with a re-settable non-return valve, the non-return valve opening in the direction of the respective chamber. This serves not only for using the hydraulic cylinders as suspension cylinders but also, with the suspension deactivated, for using the hydraulic cylinders as a type of incline compensation, purposely allowing the frame in an inclined position to be hydraulically tilted to the side, in order to increase the stability and to compensate for an incline or a canted position.

The suspension system according to the invention may be used in particular on agricultural or construction industry vehicles, in particular loader vehicles, having a floating first axle and a sprung second axle, since the critical load states often occurring in the operation of such vehicles can be detected by the devices provided for load state sensing and corresponding measures taken to rectify such load states or to establish a non-critical load distribution on the vehicle, before the suspension of the vehicle is activated. Depending on the type of vehicle, the front axle or the rear axle of the vehicle may be sprung, and the rear axle or the front axle may be floating.

The suspension system according to the invention constitutes a suspension with hydraulic roll stabilization for the sprung axle of the vehicle. It is advantageous here that the sprung axle can be sprung without the need for additional mechanical measures for roll stabilization. The aforementioned suspension system has two hydraulic cylinders, which can be operated independently of one another and which resiliently support the frame of the vehicle in relation to the axles of the vehicle. In order to prevent rolling movements occurring whilst underway, the hydraulic cylinders are connected to one another in a hydraulic cross connection. The associated compensating movements of the one hydraulic cylinder during movements of the other hydraulic cylinder counteract rolling of the frame relative to the vehicle axes, so that rolling movements of the vehicle are hydraulically suppressed. A sprung axle considerably reduces the impacts on the overall structure of the vehicle and thus increases the life of load-bearing pads. Owing to the reduced vibrations, even smaller components are less stressed, so that their reliability is increased. The suspension system furthermore brings considerable improvements in ride comfort and increases the driving stability at high speeds. This may also afford time advantages in the operation of the vehicle. A further advantage is that the suspension system according to the invention manages with two hydraulic accumulators, provided that it is ensured that suspension movements cannot lead to a vacuum in the hydraulic accumulators, which except in piston accumulators would lead to damaging of the hydraulic accumulator.

BRIEF DESCRIPTION OF THE DRAWINGS

The invention and further advantages and advantageous developments and embodiments of the invention will be described and explained in more detail below with reference to the drawing which shows an exemplary embodiment of the invention, and in which.

DESCRIPTION OF THE PREFERRED EMBODIMENT

Figure 1:
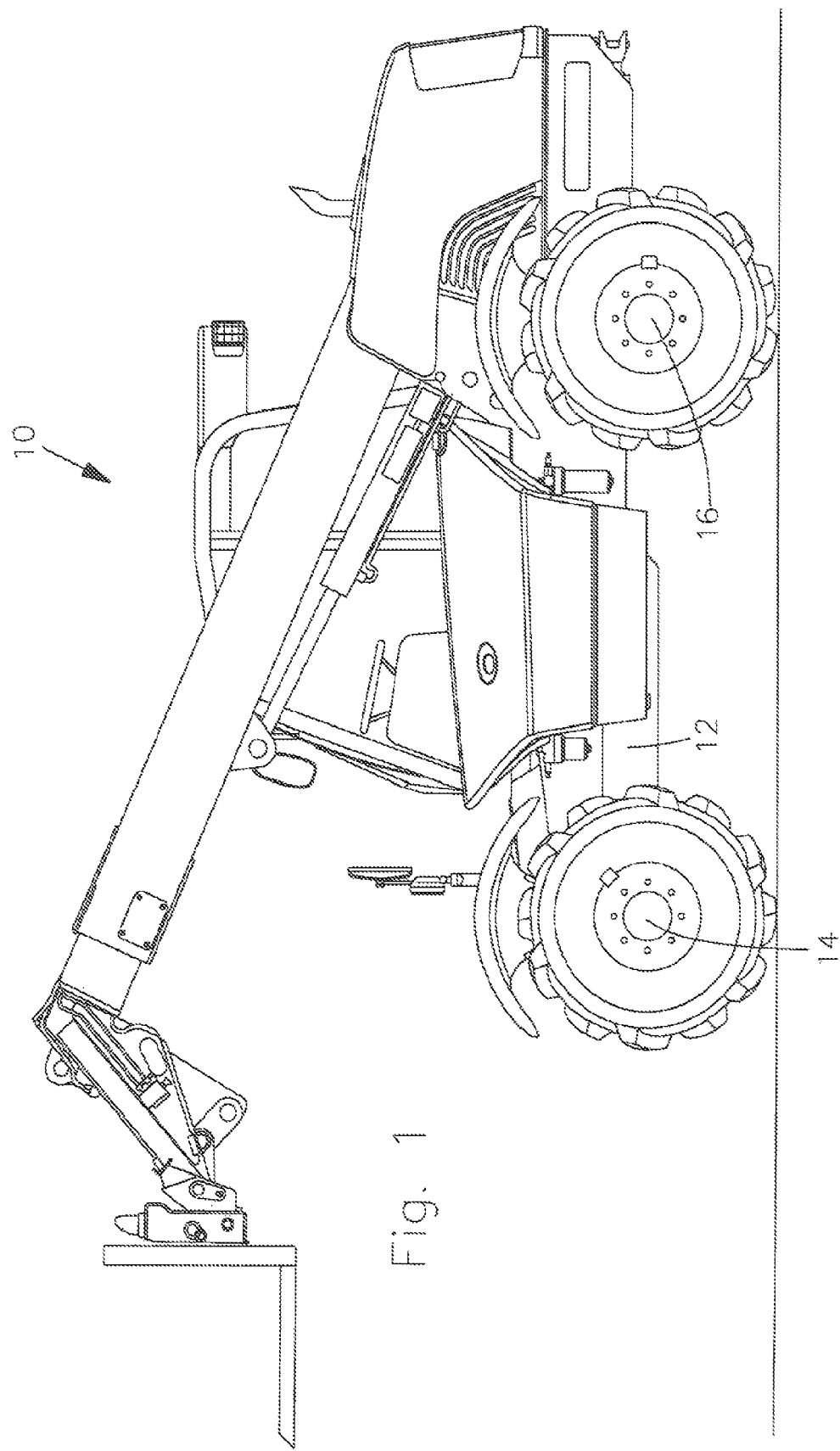
FIG. 1 is a side view of a telescopic loader having a suspension system according to the invention.

FIG. 1 shows an agricultural vehicle 10 in the form of a telescopic loader, which has a frame 12, a font axle 14 and a rear axle 16. The rear axle 16 is floating, as is usual for telescopic loaders. The front axle 14 is sprung in such a way that hydraulic cylinders 18, 20, which are part of a suspension system 22 with hydraulic roll stabilization, explained in more detail in FIGS. 2 to 6, extend between the frame 12 and the front axle 14, on either side of the vehicle central longitudinal axis. Similarly, the front axle 12 could also be floating and the hydraulic cylinder for suspension of the rear axle 16 could be correspondingly arranged between the rear axle 16 and the frame 12. It is also feasible to use such a suspension system 22 on a tractor (with or without front loader), a wheeled loader or another loader vehicle.

The suspension system 22 will be described in detail with reference to FIGS. 2 to 6, the system components for the load state sensing being represented only in FIGS. 2 to 4, and having been omitted for the sake of simplicity in FIG. 5. For the sake of simplicity, the representation of a control valve device 24 or 24' has furthermore been dispensed with in FIGS. 2 to 4, and will be described in more detail with reference to FIGS. 5 and 6.

Figure 2:
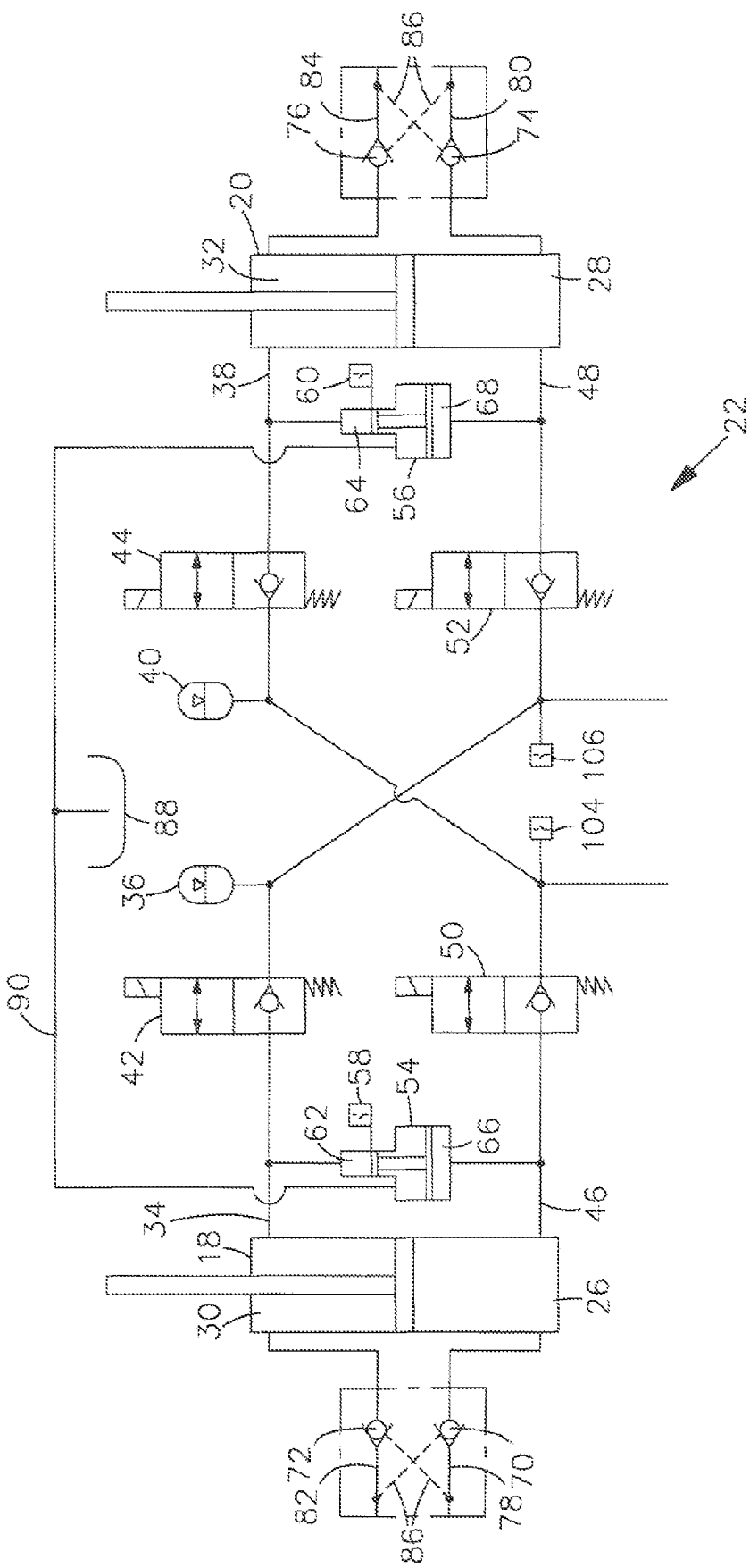
FIG. 2 is a schematic hydraulic circuit diagram (without control valve device) of an exemplary embodiment of a suspension system with hydraulic load state detection by means of pressure transducers.

In a first exemplary embodiment according to FIG. 2, the suspension system has a first hydraulic cylinder 18 and a second hydraulic cylinder 20. The hydraulic cylinders each have a piston-side chamber 26, 28 and a piston rod-side chamber 30, 32. The piston rod-side chamber 30 of the first hydraulic cylinder 18 is connected via a hydraulic line 34 to a first hydraulic accumulator 36. The piston rod-side chamber 32 of the second hydraulic cylinder 20 is connected via a hydraulic line 38 to a second hydraulic accumulator 40. A switch valve 42 is arranged in the piston rod-side hydraulic line 34 of the first hydraulic cylinder 18 between the chamber 30 and the first hydraulic accumulator 36. A switch valve 44 is arranged in the piston rod-side hydraulic line 38 of the second hydraulic cylinder 20 between the chamber 32 and the second hydraulic accumulator 40. The piston-side chamber 26 of the first hydraulic cylinder 18 is connected via a hydraulic line 46 between the switch valve 44 and the second hydraulic accumulator 40 to the piston rod-side hydraulic line 38 of the second hydraulic cylinder 20. The piston-side chamber 28 of the second hydraulic cylinder 20 is connected via a hydraulic line 48 between the switch valve 42 and the first hydraulic accumulator 36 to the piston rod-side hydraulic line 34 of the first hydraulic cylinder 18. Arranged in the piston-side hydraulic line 46 of the first hydraulic cylinder 18, between the chamber 26 and the second hydraulic accumulator 40, is a switch valve 50. Arranged in the piston-side hydraulic line 48 of the second hydraulic cylinder 20, between the chamber 28 and the first hydraulic accumulator 36, is a switch valve 52. Between the two hydraulic cylinders 18, 20, a first connecting line is produced by means of the piston rod-side hydraulic line 34 of the first hydraulic cylinder 18 in connection with the piston-side hydraulic line 48 of the second hydraulic cylinder 20, and a second connecting line is produced by means of the piston rod-side hydraulic line 38 of the second hydraulic cylinder 20 in connection with the piston-side hydraulic line 46 of the first hydraulic cylinder 18, with the first and second connecting lines therefore constituting a type of hydraulic cross connection, as a result of which the piston rod-side chamber 30 of the first hydraulic cylinder 18 can be connected to the piston-side chamber 28 of the second hydraulic cylinder 20, or both chambers 30, 28 can be connected to the first hydraulic accumulator 36, and, similarly thereto, the piston rod-side chamber 32 of the second hydraulic cylinder 20 can be connected to the piston-side chamber 26 of the first hydraulic cylinder 18, or both chambers 32, 26 can be connected to the second hydraulic accumulator 40. The switch valves 42, 44, 50, 52 each have a flow position, in which a hydraulic flow is permitted in both ducting directions, and a closed position, in which a hydraulic flow is permitted only in the direction of the respective chamber 30, 32, 26, 28 by means of a non-return valve integrated into each of the switch valves 42, 44, 50, 52.

In the exemplary embodiment represented in FIG. 2 a first pressure transducer 54 is arranged on the first hydraulic cylinder 18 between the chambers 26, 30. A second pressure transducer 56 is arranged on the second hydraulic cylinder 20 between the chambers 28, 32. The pressure transducers 54, 56 are each provided with a position switch 58, 60. Like the hydraulic cylinders 18, 20, the pressure transducers 54, 56 have a first chamber 62, 64 and a second chamber 66, 68, the first chamber 62, 64 in each case being hydraulically connected to the piston rod-side chamber 30, 32 of the hydraulic cylinders 18, 20 and the second chamber 66, 68 in each case being hydraulically connected to the piston-side chamber 26, 28 of the hydraulic cylinders 18, 20. The pressure transducers 54, 56 are here designed so that the area ratio of the pressure-transmitting areas in the chambers 62, 66 and 64, 68 corresponds to the area ratios of the pressure-transmitting areas in the chambers 30, 26 and 32, 28 of the hydraulic cylinders 18, 20.

The hydraulic cylinders 18 and 20 are furthermore provided with re-settable non-return valves 70, 72 and 74, 76, which are capable of opening in the direction of the chambers 26, 30 and 28, 32 of the hydraulic cylinders 18 and 20. The piston-side non-return valves 70, 74 are arranged in the hydraulic lines 78, 80, which are connected to the piston-side chamber 26, 28 of the respective hydraulic cylinder 18, 20. The piston rod-side non-return valves 72, 76 are arranged in the hydraulic lines 82, 84, which are connected to the piston rod-side chamber 30, 32 of the respective hydraulic cylinder 18, 20. For resetting or opening each of the non-return valves 70, 72, 74, 76 a control pressure line 86 is provided, which for each hydraulic cylinder 18, 20 in each case connects the piston-side non-return valve 70, 74 to the piston rod-side hydraulic line 82, 84 and the piston rod-side non-return valve 72, 76 to the piston-side hydraulic line 78, 80. In this way the first and second hydraulic cylinders 18, 20 can be adjusted, independently of the switch valves 42, 50 provided in the hydraulic lines 34, 46 of the first hydraulic cylinder 18 and independently of the switch valves 44, 52 provided in the hydraulic lines 38, 48 of the second hydraulic cylinder 20. Thus it is possible to compensate for an inclination or a canted position, for example, and/or to adjust the load state of the vehicle 10.

The pressure transducers 54, 56 with preferably integral position switches 58, 60 serve as load case detectors, which are correspondingly capable of detecting a load state or load case on the hydraulic cylinders 18, 20. The basic concept is to make it possible to detect whether a load is pulling on either of the two piston rods of the hydraulic cylinders 18, 20. Should this be the case, this would mean that there is a higher pressure occurring on the piston rod side of the hydraulic cylinder 18, 20 affected than when the piston rod is not loaded. Such a pressure differential can occur due to the presence of a constrained pressure in the hydraulic cylinder 18, 20, which has resulted, for example, due to external heating or to an adjustment of the hydraulic cylinder 18, 20 via the two resettable non-return valves 70, 72 and 74, 76 in order to compensate for a canted position. In order to detect this constrained pressure, use is made of the pressure transducers 54, 56, the area ratios of which correspond to those of the hydraulic cylinders 18, 20. Should a critical load state or load case be detected, this must accordingly be compensated for before the hydraulic suspension is activated, which can be done by appropriately switching in the hydraulic accumulators 36, 40 via the respective switch valves 42, 44, 50, 52. To compensate for the critical load states, the hydraulic cylinders 18, 20 must be correspondingly controlled via the hydraulic lines 78, 82 and 80, 84 provided with the re-settable non-return valves 70, 72 and 74, 76.

Figure 2A:
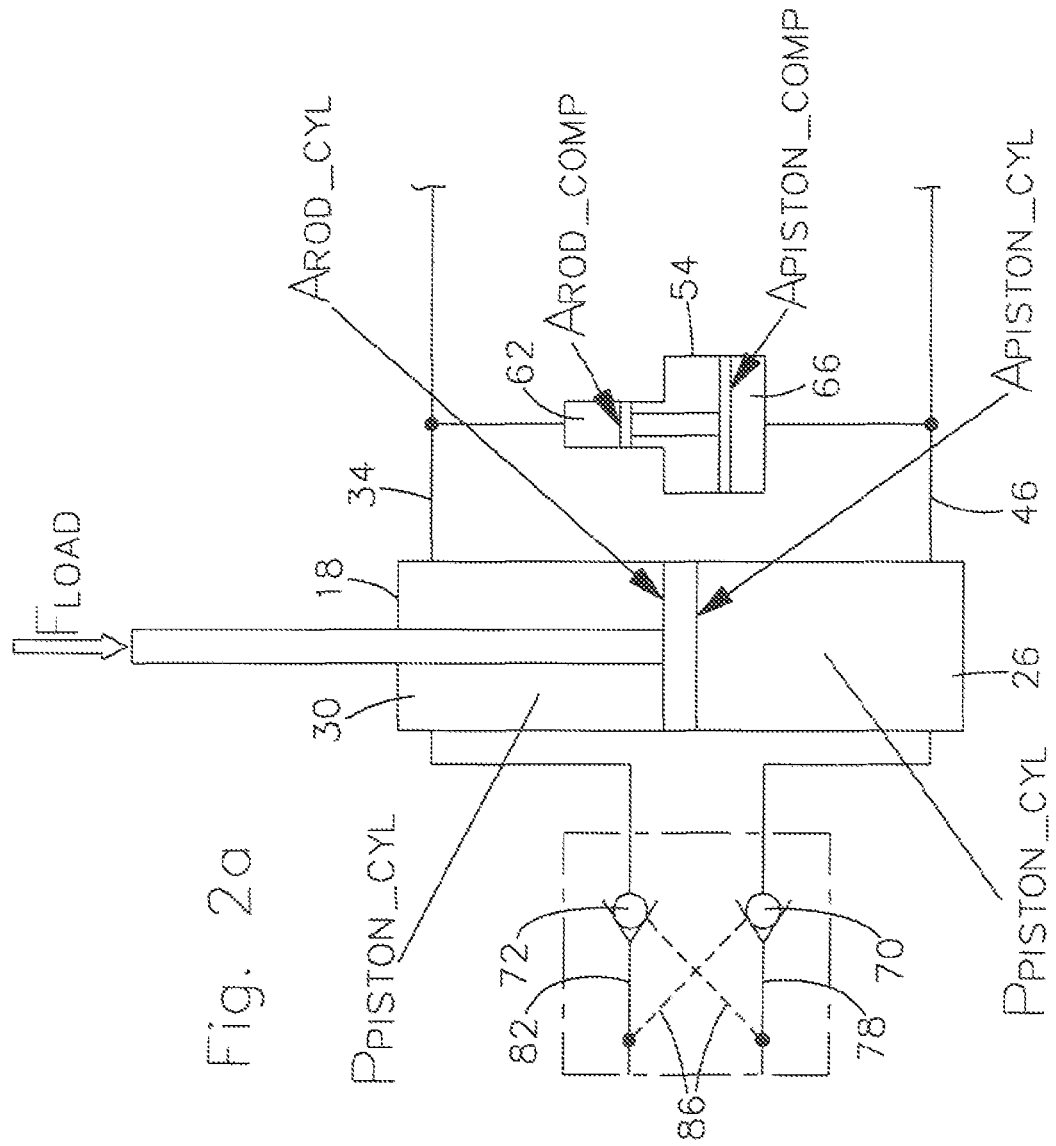
FIG. 2a is a schematic drawing of a hydraulic cylinder with pressure transducer showing a schematic and exemplary representation of the respective areas, pressures and forces.

In FIG. 2a the equilibrium of forces and pressures occurring on the hydraulic cylinder 18 and on the pressure transducer 54 is explained in more detail with reference to the example of the first hydraulic cylinder 18 and the first pressure transducer 54. The statements regarding this will apply analogously to the second hydraulic cylinder 20 and the second pressure transducer 56.

The following equilibrium of forces results on the piston rod of the hydraulic cylinder 18, where pROD_CYL is the pressure in the piston rod-side chamber 30, AROD_CYL is the piston rod-side piston area, FLOAD its an external force acting on the piston rod, pPISTON_CYL is the pressure in the piston-side chamber 26 and APISTON_CYL is the piston-side piston area:

pROD_CYL*AROD_CYL+FLOAD=pPISTON_CYL*APISTON_CYL.

The following equilibrium of forces is established on both areas AROD_COMP and APISTON_COMP of the pressure transducer 54:

pROD_CYL*AROD_COMP=pPISTON_CYL*APISTON_COMP.

For the areas AROD_CYL and APISTON_CYL of the hydraulic cylinder 18 and AROD_COMP and APISTON_COMP of the pressure transducer 54, the following condition must be valid:

AROD_CYL/APISTON_CYL=AROD_COMP/APISTON_COMP

If this condition is fulfilled and no external force is acting on the hydraulic cylinder, a constrained pressure in the cylinder would be compensated for, since the piston rod of the hydraulic cylinder 18 and the piston rod of the pressure transducer 54 would each move into a position in which an equilibrium of forces prevailed. On the pressure transducer 54 this may be assisted by means of centring springs, in order to suppress any friction effects. At the instant an external force acts on the piston rod of the hydraulic cylinder 18, the pressure equilibrium is disturbed and the piston of the pressure transducer 54 changes position. If a (positive) force pressing on the piston of the hydraulic cylinder 18 acts on the cylinder rod, the pressure pPISTON_CYL increases and the piston of the pressure transducer 54 is forced upwards. At the same time, a positive force means that part of the weight of the frame 12 of the vehicle 10 rests on the piston rod. If a force pulling on the piston rod acts on the piston rod of the hydraulic cylinder 18, the pressure pROD_CYL increases and the piston of the pressure transducer 54 is pressed downwards. In this case a negative force means that the frame 12 of the vehicle 10 does not rest on the piston rod, but is instead pulling on it, which when the rod-side switch valve 42 (and 44) opens could lead to extending of the piston rod and thereby to tipping of the frame 12 and of the vehicle 10.

Since the direction of the force can be determined from the position of the piston of the pressure transducer 54, 56, this part of the exemplary embodiment is concerned with determining the position of the piston of the pressure transducer 54, 56 by means of a switch 58, 60 or sensor. The precise embodiment of the sensor or switch 58, 60 may vary widely and will not be described in further detail here. For safety reasons, however, it is advisable for a switch 58, 60 to be designed as a normally open contact. This ensures that a broken cable cannot lead to a misinterpretation. It is furthermore important that the piston of the pressure transducer 54, 56 is seated leak-tight, so that no oil can flow from one chamber 26, 28 of the hydraulic cylinder 18, 20 to the other chamber 30, 32 of the hydraulic cylinder 18, 20. A leakage line 90 opening into a hydraulic tank 88 serves to compensate for the volume either generated or disappearing under the displacement of the piston of the pressure transducer 54, 56. It is important that the variable volume of the pressure transducer 54, 56 is not so great that it can result in uncontrollable movements of the frame 12.

The function of the pressure transducer 54, 56 and the switch can basically also be described as that of pressure differential switches, which are quite common in the low-pressure range and which can assume the same functions.

In the non-critical load state when the frame 12 is resting on both piston rods of the hydraulic cylinders 18, 20, the pistons of the pressure transducers 54, 56 are in an upper position, which can be detected by the switches 58, 60 fitted. In such a case the two piston rod-side switch valves 42, 44 of the hydraulic cylinders 18, 20 can safely be opened.

A critical load state or load case arises when, with reference to the drawing, FIG. 2, the frame 12 rests, for example, oh the piston rod of the second hydraulic cylinder 20 and is pulling on the piston rod of the first hydraulic cylinder 18. In such a case, the frame 12 would immediately tilt to the right if the piston rod-side switch valve 42 of the first hydraulic cylinder were opened. This critical load state will be detected, however, inasmuch as the pistons of the pressure transducers 54, 56 run into different positions, that is to say the piston of the pressure transducer 56 of the second hydraulic cylinder 20 runs into an upper position and the piston of the pressure transducer 54 of the first hydraulic cylinder 18 runs into a lower position. The switch 60 of the second pressure transducer 56 would therefore be closed and the switch 58 of the first pressure transducer 54 open. The critical load state is thereby clearly detectable and an activation of the suspension can be prevented by opening of the switch valves 42, 44, 50, 52.

The same applies to the reverse case, that is to say when, with reference to the drawing, FIG. 2, the frame rests on the piston rod of the first hydraulic cylinder 18 and is pulling on the piston rod of the second hydraulic cylinder 20. In such a case the frame 12 would immediately tilt to the left, if the piston rod-side switch valve 44 of the second hydraulic cylinder were opened. As in the case above, this critical load state would here also be detectable, since instead of both switches 58, 60, only the one switch 58 of the first pressure transducer 54 is closed.

Figure 3:
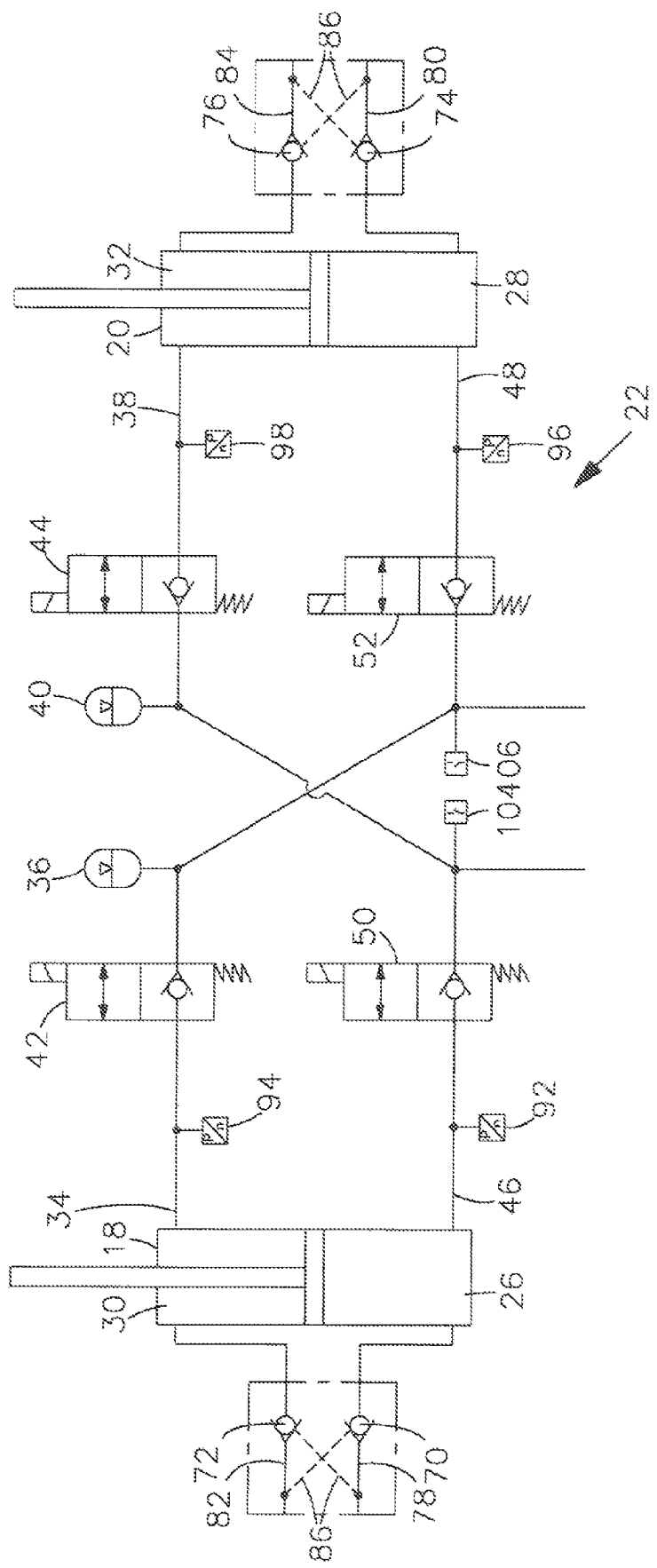
FIG. 3 is a schematic hydraulics circuit diagram (without control valve device) for a further exemplary embodiment of a suspension system with hydraulic load state detection by means of pressure sensors.

In a further exemplary embodiment, as shown in FIG. 3, the load state detection is achieved by means of four pressure sensors 92, 94, 96, 98, which are provided instead of the pressure transducers 54, 56, the pressure sensors 92, 94, 96, 98, registering the pressures prevailing in the chambers 26, 30, 28, 32 of the hydraulic cylinders 18, 20. A corresponding evaluation of the measured pressures provides an indication of the forces acting on the piston rods of the hydraulic cylinder 18, 20, so that tensile and compressive forces can be detected as a function of the load.

Figure 4:
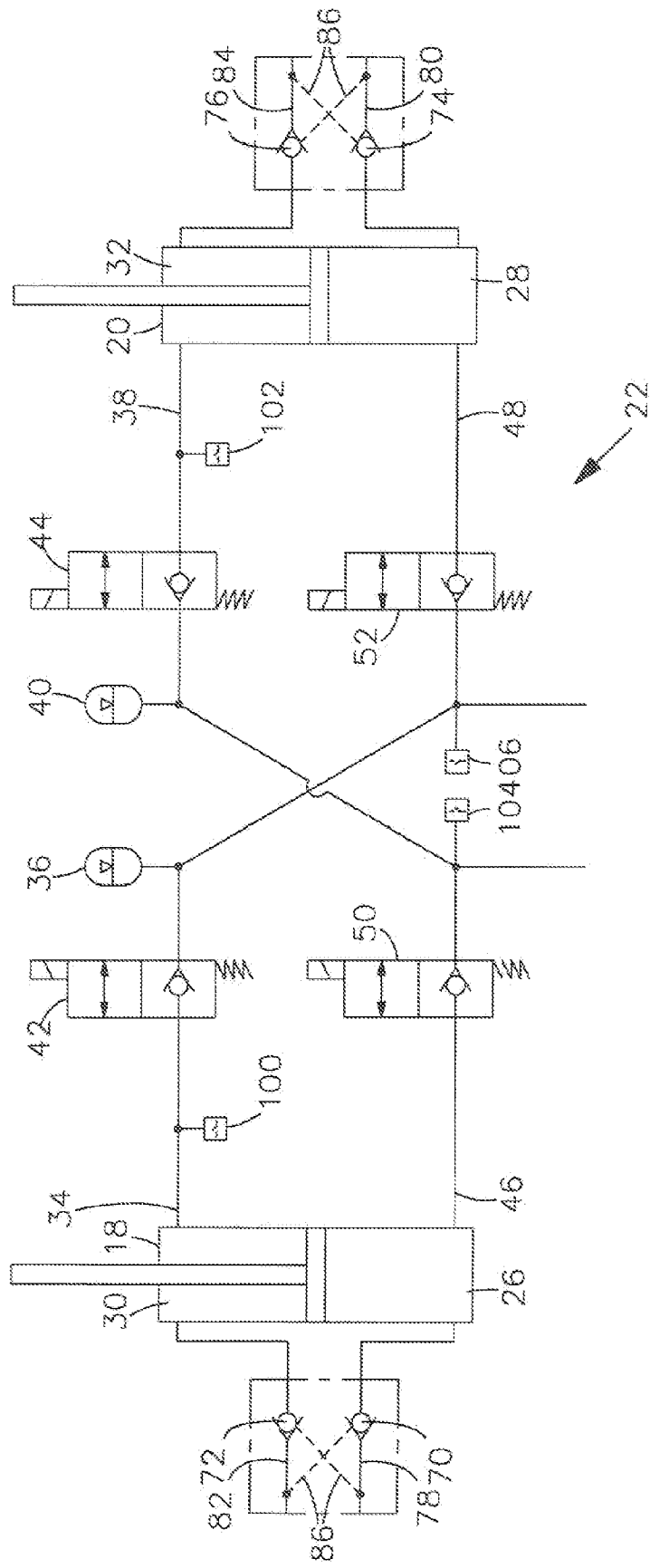
FIG. 4 is a schematic hydraulics circuit diagram (without control valve device) of a further exemplary embodiment of a suspension system with hydraulic load state detection by means of pressure switches.

A further exemplary embodiment is shown in FIG. 4, in which a first pressure switch 100 is arranged between the piston rod-side chamber 30 of the hydraulic cylinder 18 and the switch valve 42, and a second pressure switch 102 is arranged between the piston rod-side chamber 32 of the second hydraulic cylinder 20 and the switch valve 44. Should a specific pressure, which can be generated only by a force pulling on the piston rod, here be exceeded in one of the piston rod-side chambers 30, 32, the pressure switches 100, 102 close, or better still open, and the state is detected as unsafe or the vehicle 10. It is obviously feasible for pressure sensors to assume the functions of the pressure switches 100, 102. Since constrained forces can be taken into account and detected as such only to a limited extent, an additional safety margin should be allowed in a corresponding activation criterion for the suspension.

In another exemplary embodiment the forces acting on the piston rods can also be directly or indirectly measured, registered and evaluated by means of force sensors (not shown) and the load states acting on the hydraulic cylinder 18, 20 and on the vehicle 10 thus detected. A direct measurement here would measure the bearing forces on the articulation points of the hydraulic cylinders 18, 20, for example, or might represent the tensile forces acting on the piston rods. An indirect measurement can be made by measuring the flexure or torsion of various areas of the axle 14, 16 or of the frame 12, and inferring the load state of the vehicle 10 from this.

The exemplary embodiments described above comprise a suspension system 22 with hydraulic roll stabilization and means for load state detection, both hydraulic cylinders 18, 20 being safeguarded by leak-tight switch valves 42, 50 and 44, 52 in such a way that they cannot move if the suspension is not activated and the switch valves 42, 44, 50, 52 are closed. The piston rod-side chamber 30 of the first hydraulic cylinder 18 is connected to the piston-side chamber 28 of the second hydraulic cylinder 20, and the piston rod-side chamber 32 of the second hydraulic cylinder 20 is connected to the piston-side chamber 26 of the first hydraulic cylinder 18, so that, when the suspension is active, the hydraulic cylinders 18, 20 influence one another and can constitute roll stabilization if the switch valves 42, 44, 50, 52 are correspondingly switched. Since both hydraulic cylinders 18, 20 are moveably arranged, corresponding moving parts of the hydraulic lines 34, 46 and 38, 48 are embodied as hoses. In order to prevent the frame subsiding in the event of a fractured pipe, both the leak-tight switch valves 42, 44, 50, 52 and the respective resettable non-return valves 70, 72, 74, 76 must be fitted on the hydraulic cylinders 18, 20 in such a way that no hoses are provided as connecting elements between these components. The hydraulic accumulators 36, 40 can each be arranged anywhere between the piston rod-side switch valves 42, 44 and the piston-side switch valves 50, 52.

The hydraulic lines 34 and 48 which are connected to one another are monitored by a pressure switch 104, and the hydraulic lines 38 and 46 which are connected to one another are monitored by a pressure switch 106 and serve as an electronic pipe fracture safeguard, which ensures that a pressure drop in the event of a fractured pipe is immediately detected by an electronic control unit 107 implemented in the suspension system 22 and corresponding control measures are taken, and that corresponding control commands for the switch valves 42, 44, 50, 52 are generated by the electronic control unit 107, in order to hold the frame 12 of the vehicle 10 in its position. The pressure switches 104, 106 may here be embodied as pressure sensors.

A detailed description of the electronic control unit 107 will be dispensed with here, since the use of electronic control units 107 in hydraulic suspension systems 22 and the generation of corresponding control commands by electronic control units 107 is part of the prior art and can easily be translated by an average person skilled in the art active in the sphere of electro-hydraulic control technology. It is naturally to be assumed here that all switch valves relevant to the circuit can be controlled via control signals generated by the electronic control unit. Furthermore, it is naturally assumed that the electronic control unit 107 receives corresponding signals and uses these to generate control signals, signals for generating control signals for the respective exemplary embodiment described being supplied by the sensors and switches (58, 60, 92, 94, 96, 98, 100, 102, 104, 106) represented in FIGS. 2 to 5 and of electronic and/or electro-hydraulic relevance to the circuit. For reasons of simplicity, the electronic control unit 107 has only been illustrated in FIG. 5, wherein the exemplary embodiments described on the basis of the other figures should also contain a corresponding electronic control unit 107.

The basic hydraulics circuit diagram for a front axle suspension with hydraulic roll stabilization has already been described above with reference to FIGS. 2 to 4, it now being proposed to examine the exemplary embodiments for the control valve device 24, serving for the hydraulic supply to the suspension system 22, in more detail below with reference to FIGS. 5 and 6.

Figure 5:
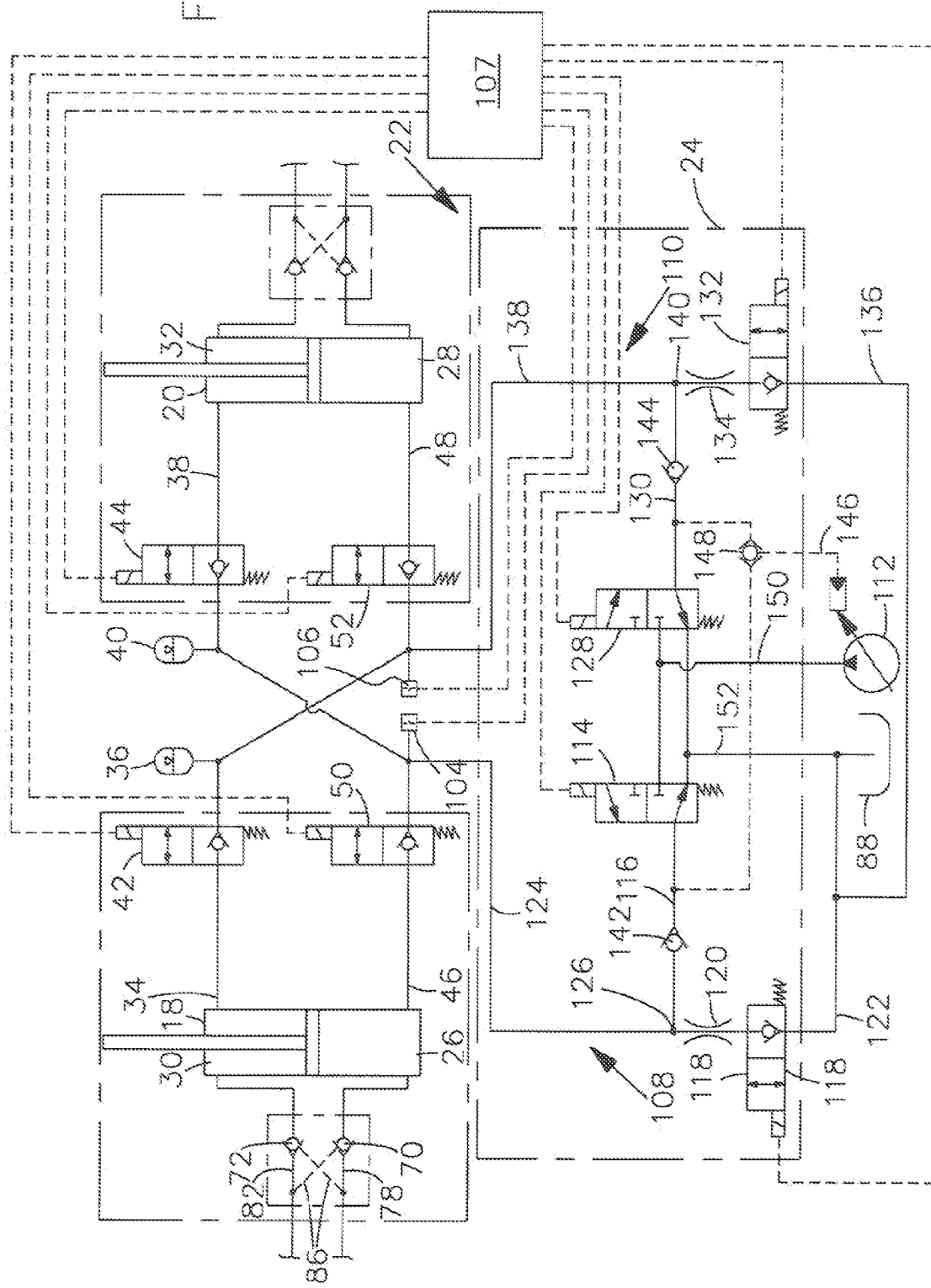
FIG. 5 is a simplified schematic hydraulics circuit diagram (without load case detection) according to the exemplary embodiments represented in FIGS. 2 to 4, but showing the control valve device.

FIG. 5 shows the hydraulics circuit diagram of the suspension system 22 used for the preceding exemplary embodiments in connection with an exemplary embodiment of the control valve device 24 (a repeated representation of the components used for load state detection being omitted here). The control valve device 24 has a first and a second control chain 108, 110, the control chains 108, 110 being aligned parallel with one another and supplied by a common hydraulic pump 112. The first control chain 108 has a first admission line 116 provided with a first admission control valve 114 and a first discharge line 122 provided with a first discharge control valve 118 and a first restrictor or orifice 120, and a first supply line 124, the first admission line 116 and the first discharge line 122 being connected to the first supply line 124 at a junction 126. The second control chain 110 has a second admission line 130 provided with a second admission control valve 128 and a second discharge line 136 provided with a first discharge control valve 132 and a second restrictor or orifice 134, and a second supply line 138, the second admission line 130 and the second discharge line 136 being connected to the second supply line 138 at a junction 140. The discharge lines 122, 136 each open into the hydraulic tank 88. The first admission line 116 is provided with a first non-return valve 142 closing in the direction of the first admission control valve 114 and the second admission line 130 with a second non-return valve 144 closing in the direction of the second admission control valve 114. A load-sensing device 146 (load and pressure sensing device) is also provided, which, branching off via a shuttle valve 148, signals the highest hydraulic pressure prevailing in the admission lines 116, 130 at any given time to the hydraulic pump 112, so that the hydraulic pump 112 embodied as a variable adjusting pump system receives a corresponding pressure signal. A pump line 150 and a tank line 152 connect the two admission control valves 114, 128 to the hydraulic pump 112 and to the tank 88. The non-return valves 142, 144 are arranged between the corresponding junctions 126, 140 and the admission control valves 114, 128, the load-sensing device 146 picking up the pressure in the admission lines 116, 130 between the non-return valves 142, 144 and the admission control valves 114, 128. The admission control valves 114, 128 are embodied as 3/2-way switch valves, so that in an admission position hydraulic fluid is delivered to the suspension system 22, and in a relief position the hydraulic fluid present in the admission line 116, 130 can flow off into the hydraulic tank 88. The load-sensing device 146 is thereby relieved and the pressure that has built up in the load-sensing device is simultaneously reduced. The discharge control valves 118, 132 are embodied as 2/2-way switch valves and each have a flow position in both ducting directions and a leak-tight closed position closing in the direction of the hydraulic tank 88. To boost the pressure of a control chain 108, 110, the corresponding admission control valve 114, 128 is switched into a position in which it is open in the direction of the hydraulic pump 112 and closed to the hydraulic tank 88 and the corresponding discharge control valves 118, 132 are brought into their corresponding closed position. For reducing the pressure, the corresponding admission control valve 114, 128 is brought into a position in which it is closed in the direction of the hydraulic pump 112 and opened to the hydraulic tank 88 and the discharge control valve 118, 132 is simultaneously brought into the flow position. The control sequence for boosting pressure and for reducing pressure can be performed both singly for only one control chain 108, 110, and for both control chains 108, 110 together, according to control requirements. Pressure can furthermore be boosted in one control chain 108, 110, whilst a pressure reduction is taking place in the other control chain 108, 110.

The control valve device 24 described above basically fulfils all requisite functions, it being possible, where necessary to make the volumetric flows electronically controllable by means of flow control valves (not shown).

Figure 6:
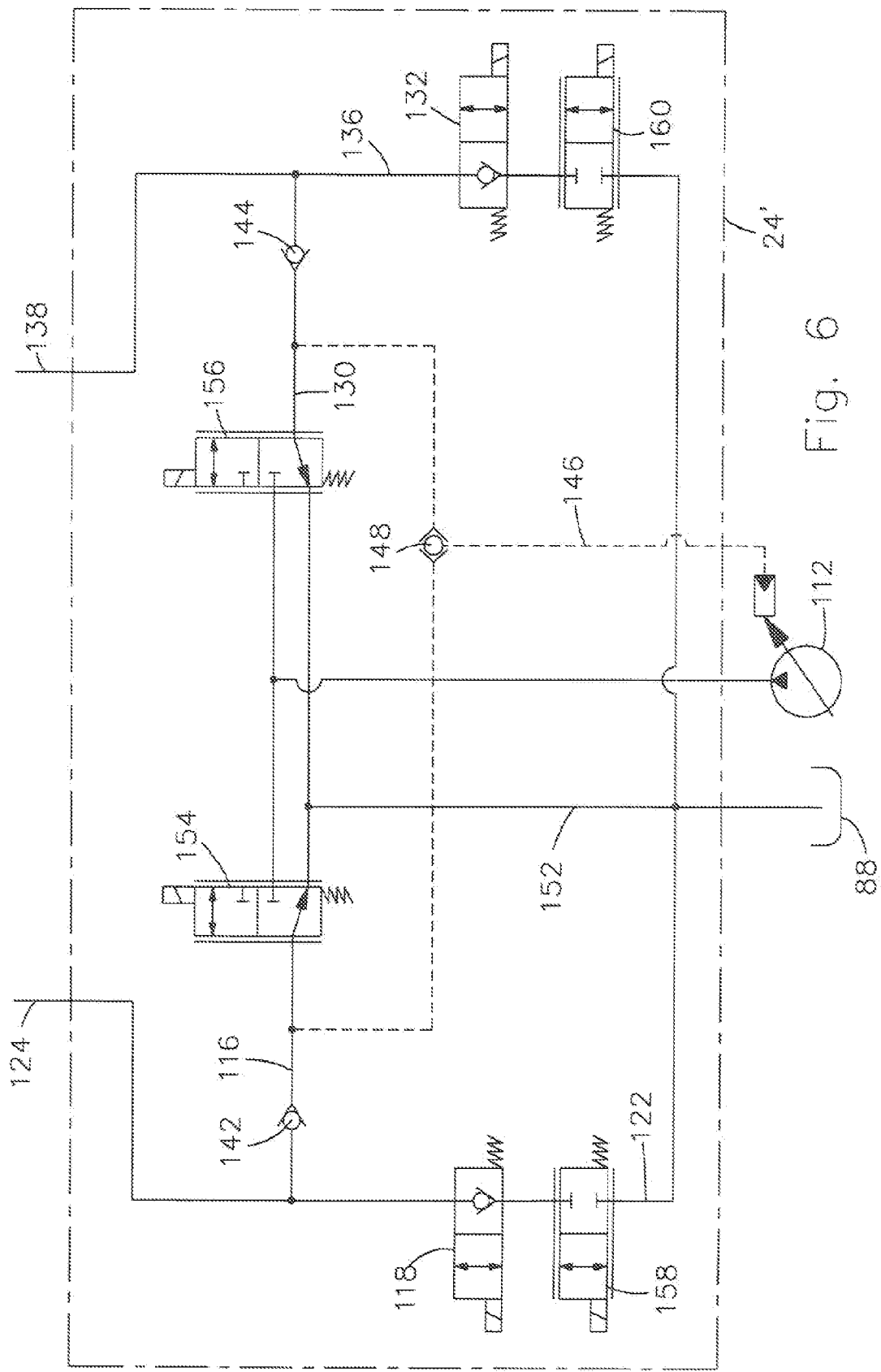
FIG. 6 is a simplified schematic hydraulics circuit diagram (without load case detection) according to FIG. 5, with an alternative embodiment of the control valve device; and, FIG. 7 is a simplified schematic hydraulics circuit diagram (without load case detection) according to FIG. 5, with a further alternative embodiment of the control valve device.

A further exemplary embodiment of a control valve device 24' is represented in FIG. 6. Here the hydraulic cylinders 18, 20 can be controlled with volumetric flows adjustable independently of one another. This is particularly important during a loading operation, in order that the hydraulic cylinders 18, 20 can extend more or less uniformly and simultaneously. It is also of interest that pressure adjustment operations can be performed smoothly. This in turn leads to improved ride comfort and driving safety.

The control valve device 24' represented in FIG. 6 can be used for a suspension system 22 in the same way as the control valve device 24 in all exemplary embodiments previously described. The control valve device 24' represented in FIG. 6 essentially differs from the preceding exemplary embodiment in that instead of ON/OFF-switch valves, the first and second admission control valves 114 and 128 are embodied as first and second proportional admission control valves 154 and 156, these proportional admission control valves 154, 156 being electromagnetically switchable between a position open in the direction of the hydraulic pump 112 and closed to the hydraulic tank 88 and a position closed in the direction of the hydraulic pump 112 and open to the hydraulic tank 88. The first and second discharge control valves 118, 132 in the discharge lines 122, 136 have furthermore each been supplemented by a further first and second proportional discharge control valve 158 and 160, which can both be switched between a bilaterally closed position and a bilateral opening position. Leak-tight discharge control valves 118, 132 are likewise advantageous in the discharge lines 122, 136, since conventional proportional valves are not leak-tight. It is obviously feasible here, as in the preceding figures, to replace leak-tight switch valves with resettable non-return valves, which are controlled by suitable means. It is only important that the connection can be closed and if necessary opened without any leakage. Where proportional discharge control valves 158, 160 are used, the restrictors and orifices 120, 134 provided in FIG. 5 are omitted.

Figure 7:
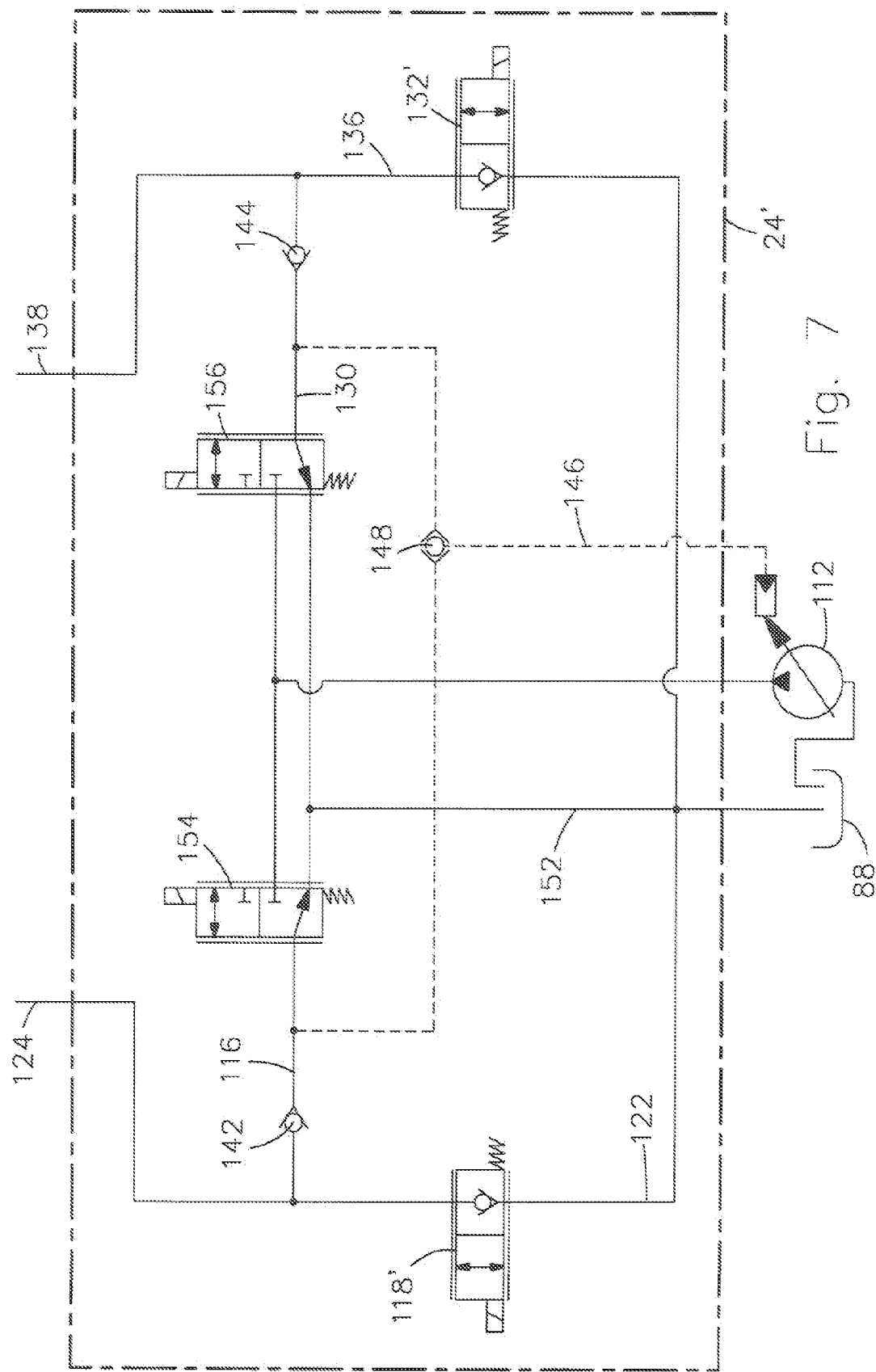

In an alternative embodiment to FIG. 6 as illustrated in FIG. 7, leak-tight proportional discharge control valves 118', 132', which contain the required throttle or orifice function, can also be used.

In the event of a pressure increase in the suspension system 22 and in the loading operation state, the hydraulic fluid admission can be varied, as necessary, by means of the first and second proportional admission control valves 154, 156. The discharge-side valves 118, 132, 158, 160 are in the closed position. It is therefore not necessarily the hydraulic fluid flow that is adjustable but rather the rate of travel of the hydraulic cylinders 18, 20. As in the exemplary embodiments in FIG. 5, the greatest load pressure needed is signalled to the adjustable hydraulic oil pump 112 by means of the load-sensing device 146 in conjunction with the shuttle valve 148.

In order to reduce the pressure in the suspension system 22, the leak-tight discharge control valve 118, 132 is first opened followed by the proportional discharge control valve 158, 160, so that the outflow of hydraulic fluid to the hydraulic tank 88 can be controlled. In order to relieve the load-sensing pressure, the proportional admission control valve 154, 156 is run into its position in which it is closed in the direction of the hydraulic pump 112 and open to the hydraulic tank 88, both control chains 108, 110 being similarly controllable, but independently of one another. Here too, the rate of travel of the respective hydraulic cylinders 18, 20 again serves as a measure for the adjustment of the proportional discharge control valve 158, 160. Whether the proportional discharge control valve 158, 160 is situated upstream or downstream of the discharge control valve 118, 132 is basically of no importance, since it has no effect on the function.

As already mentioned, an independent control of both control chains 108, 110 is possible both with the control valve device 24 described with reference to FIG. 5 and with the control valve device 24' described with reference to FIG. 6, so that it is possible to obtain a pressure increase in one control chain 108 and at the same time a pressure reduction in the other control chain 110, and vice-versa. It is furthermore also possible to obtain a simultaneous pressure increase or a simultaneous pressure reduction in both control chains 108, 110. Corresponding control sequences are filed in the electronic control unit 107 and can be selected by means of corresponding levers or switches (not shown) for activation and/or control of the suspension system 22.

The working of the suspension system 22 will be described below with reference to FIG. 5, a repeated representation and description of the load case sensing being dispensed with, since this has already been covered and described in detail above. It should again be pointed out that both the control valve device 24 according to FIG. 5 and the control valve device 24' according to FIG. 6 can be used and applied. It is further assumed that the load case is accordingly detected as safe and that the suspension can therefore be activated.

FIG. 5 shows the suspension system 22 in the initial state, with the frame 12 resting more or less evenly on both hydraulic cylinders 18, 20 and a certain constrained pressure in both hydraulic cylinders 18, 20. With the suspension system 22 in this state, all switch valves 42, 44, 50, 52 are closed, the admission control valves 114, 128 and 154, 156 are in the position in which they are closed in the direction of the hydraulic pump 112 and open to the hydraulic tank 88, the discharge control valves 118, 132 and 158, 160 are in their closed position, both of the hydraulic accumulators 36, 40 are discharged and the load state is rated as non-critical by the load state detection means (not shown in FIG. 5).

On activation of the suspension system 22, an accumulator charging state ensues. The accumulator charging state and the activation of the suspension are triggered by the machine operator or by the electronic control unit 107 as a function of the speed, or in some other way, provided that a non-critical load state has been assumed and is present. For this purpose both of the switch valves 42, 44 on the piston rod side are placed in the throughflow position, and a connection of the piston rod-side chambers 30, 32 to the control valve device 24 or 24' is produced. At the sane time, the two admission control valves 114, 128 or 154, 156 switch into their switching position in which they are open in the direction of the hydraulic pump 112 and are closed towards the hydraulic tank 88, and initially form a connection of the pump line 150 to the suspension system 22. The hydraulic oil now flows via the pump line 150, the admission control valves 114, 128, the admission lines 116, 130, the non-return valves 142, 144 and the supply lines 124, 138 into the hydraulic accumulators 36, 40. At the same time a connection is established to the load-sensing device 146, so that the highest consumer pressure to the hydraulic pump 112, which is preferably embodied as an adjustable pump system, can be signalled via the shuttle valve 148. The non-returning valves 142, 144 are necessary in order to keep the leakage rate low and to afford a facility for the requisite load-sensing-signal detection between the admission control valve 114, 128 and 154, 156 and the consumer or hydraulic cylinder 18, 20. It is important that no load-sensing signal be generated if the admission control valve 114, 128 and 154, 156 is in the position in which it is closed in the direction of the hydraulic pump 112. While the hydraulic fluid flows to the hydraulic accumulators 36, 40 and to the piston rod-side chambers 30, 32 of the hydraulic cylinders 18, 20, the pressure in the system is inevitably increased.

If the pressures in the piston rod-side chambers 30, 32 have risen to the same value as in the piston-side chambers 26, 28, then the hydraulic fluid flows via the non-return valves of the piston-side switch valves 50, 52 into the piston-side chambers 26, 28 of the hydraulic cylinders 18, 20, and extends said hydraulic cylinders. These non-return valves can naturally be designed in some other way by using a double-sided, leak-tight switch valve, for example, and fitting this in a bypass line. It is important that a leak-tight connection be established, which only allows hydraulic fluid to pass in one direction and which can be opened bilaterally when necessary.

The extension of the hydraulic cylinders 18, 20 can be measured by means of a path or angle sensor (not shown), and then the two piston-side switch valves 50, 52 are opened. At the same time, the admission control valves 114, 128 or 154, 156 of the control valve device 24 or 24' are closed, since no further hydraulic fluid is required. With uneven loading of the vehicle 10, it can happen that one hydraulic cylinder 18, 20 is extended first, so that the admission control valves 114, 128 and 154, 156 also have to be switched off individually, which does not impair the basic functioning of the suspension system 22, however. It is important that the hydraulic cylinders 18, 20 extend before all the switch valves 42, 44, 50, 52 on the hydraulic cylinders 18, 20 are opened, since only in this way can it be ensured that the frame 12 will not subside or jump up. In order to make the process of loading and extending the hydraulic cylinder 18, 20 more manageable, it is feasible to use flow control valves (not shown), which keep the inlet volumetric flow of hydraulic fluid constant. Once all the switch valves 42, 44, 50, 52 on the hydraulic cylinders 18, 20 are opened, the vehicle 12 is in the suspension state, since both hydraulic cylinders 18, 20 can move freely.

The hydraulic roll stabilization now functions so that, when the first hydraulic cylinder 18 arranged on the front axle 14 retracts due to a roadway stimulus, for example, the impact is firstly damped via the second hydraulic accumulator 40 and is gently transmitted back to the front axle 14, and secondly, at the same time, the second hydraulic cylinder 20 is retracted as a result of the pressure rise in the piston rod-side chamber 32. A swing motion of the frame 12 is counteracted. In this suspension state adjustments to varying load states are always possible. In order that this can happen, as already mentioned above, for two travel or angle sensors are necessary, which serve to determine and monitor the position of the front axle 14 relative to the frame 12. If the load increases due to the picking-up of a payload, the pressure in the piston-side chambers 26, 28 of the hydraulic cylinders 18, 20 can be increased according to the process described above. Here the admission control valves 114, 128 and 154, 156 are switched in the same way as for the accumulator charging sequence. It can obviously also happen that only one side needs more pressure, which is why it is naturally also possible to use only one of the two admission control valves 114, 128 and 154, 156. If the load is reduced, on the other hand, due to the release of a payload, the pressure in the piston-side chambers 26, 28 of the hydraulic cylinders 18, 20 can be reduced. This is done by discharging hydraulic fluid from the suspension system, it being possible, here too, to discharge fluid on both sides or also on one side only. The discharging process is performed by switching the switch valves 42, 44, 50, 52 to the flow position, so that the hydraulic connections to the chambers 26, 28, 30, 32 are bilaterally opened, and by switching the discharge control valves 118, 132 and 158, 160 to their flow position, the admission control valves 114, 128 and 154, 156 being switched to the position in which they are closed in the direction of the hydraulic pump 112 and open to the hydraulic tank 88. The restrictors and orifices 120, 134 arranged in the control device 24 serve to ensure that the hydraulic fluid cannot flow off too rapidly, so that the process remains manageable. In the embodiment with the control device 24', the proportional discharge control valves 158, 160 arranged there assume this function. Instead of the restrictors or orifices 120, 134, it would also be feasible to use suitable small switch valves, or to arrange flow control valves upstream or downstream of the discharge control valve 118, 132.

Furthermore, in the suspension state an adjustment to an asymmetrical load state can also be performed if, for example, loads with an eccentric centre of gravity are being transported or the vehicle is moving along the side of an incline. For this purpose one control chain 108, 110 in the control valve device 24 and 24' is operated in the admission position and the other control chain 108, 110 in the discharge position, depending on the load state. For example, in the suspension state, i.e. when all switch valves 42, 44, 50, 52 are in the flow position, the first hydraulic cylinder 18 must be extended and the second hydraulic cylinder 20 retracted in order to correct the lead state. In this case the first control chain 108 is operated in the admission position, i.e. the first admission control valve 114 and 154 is switched to its position in which it is open in the direction of the hydraulic pump 112 and closed to the hydraulic tank 88, the first discharge control valve 118 being in the closed position. At the same time the second control chain 110 is operated in the discharge position, i.e. the second admission control valve 128 and 156 is switched into its position in which it is closed in the direction of the hydraulic pump 112 and open to the hydraulic tank 88, the second discharge control valve 118 and 160 being in the flow position. In this state the load-sensing device 146 signals a pressure in the first control chain 108, which is relayed to the hydraulic pump 112, whereas the load-sensing device 146 is relieved in respect of the second control chain 110. The hydraulic fluid delivered via the first control chain 108 can flow into the piston-side chamber 26 of the first hydraulic cylinder 18 and into the piston rod-side chamber 32 of the second hydraulic cylinder 20, as a result of which the first hydraulic cylinder 18 is raised and the second hydraulic cylinder 20 is retracted. In the reverse case, the second control chain 110 is correspondingly operated in the admission position and the first control chain 108 in the discharge position.

When the front axle 14 of the vehicle 10 is sprung and in normal working operation loads rest on this front axle 14, measures may be necessary in order to ensure a static stability and driving safety of the vehicle 10. It may be necessary, for example, for the hydraulic accumulators 36, 40 to be discharged each time following a deactivation of the suspension system (switching the switch valves 42, 44, 50, 52 to the closed position). The reason for this is the accumulator charging sequence, since this is preferably performed in such a way that the pressure in the hydraulic accumulators 36, 40 is less than in the respective piston-side chambers 26, 28. If the pressure in the hydraulic accumulators 36, 40 were higher, on opening of the piston rod-side switch valves 42, 44, the hydraulic cylinders 18, 20 would be extended uncontrollably, which constitutes a safety risk that is to be avoided. The pressure from the hydraulic accumulators 36, 40 should therefore always be discharged to a sufficiently low level. A sufficiently low level in this context does not mean that a complete draining would be advisable, since if it is designed as a diaphragm or bladder accumulator, this can again over time damage a hydraulic accumulator 18, 20. By means of pressure sensors (not shown) it is feasible here to purposely set a value designed to achieve a short charging time for the hydraulic accumulators 36, 40.

In the case of a loader vehicle having an extendable arm, such as a telescopic loader, for example, the load rests on the vehicle 10 primarily via the sprung front axe 14. It may therefore be advisable for the suspension system 22 to be switched off above a certain arm height, since with an increasing lever arm the load could build up and cause the vehicle 10 to overturn if the suspension system 22 were activated. In order to prevent this, a position sensor, angle sensor, contact switch or other suitable appliance (not shown), which sends a useable control signal (activation/deactivation signal) to the electronic control unit 107 intended to control the suspension systems 22, may be installed in order to determine the lifting height or extended length of the arm. Where necessary, the mass of the payload can also be taken into account when activating/deactivating the suspension system 22.

As already described, the position of the front axle 14 relative to the frame 12 is an important measurement. It may therefore be advisable, before activation of the suspension system 22, to move the front axle 14 into a pre-defined position relative to the frame 12, in order, for example, to provide sufficient suspension travel (travel for the hydraulic cylinders 18, 20). This can be done by control valves (not shown), which with the suspension deactivated (closed switch valves 42, 44, 50, 52) serve to adjust the hydraulic cylinders 18, 20 by way of the resettable non-return valves 70, 72, 74, 76. The position of the front axle 14 relative to the frame 12 is also important in order to be able to detect changes due to load reversal. Thus a variation or lateral shifting of the payload is registered as a static retraction or extension of the hydraulic cylinder(s) 18, 20 and can be compensated for by deliberately boosting or relieving the pressure and thereby adjusting the hydraulic cylinder strokes, so that the front axle 14 is always situated in an optimum position relative to the frame 12.

Various methods are feasible for determining the position of the front axle 14 relative to the frame 12. For, example, it is also possible to use angle sensors or travel sensors (not shown), in order to arrive at the required measurements. Registering the position of the front axle 14 relative to the frame 12 furthermore permits an adjustment of the front axle 14 with the suspension system 22 deactivated. Such an adjustment is advisable in order to increase the stability of the vehicle 10 on an incline, since the lateral inclinations of the frame 12 can be reduced, making it possible to move greater loads than normal to greater heights. It is also advisable to use the measured and registered relative position as a value for assessing the load states of the vehicle 10. For example, abrupt over-rapid movements can be identified as a fractured pipe and can serve as an additional safety feature. Thus a lateral overloading and an excessive inclination of the vehicle 10 can further be identified and the suspension system can then be switched off for safety reasons and the frame 12 run back into a safer position.

As already described above, the frame 12 must be raised on activation of the suspension system. To do this, and for adjustments to modified load states, the required hydraulic fluid must be supplied. This is basically done by a pump, which also supplies the other hydraulic functions of the vehicle 10 with hydraulic fluid. If the suspension system 22 is activated whilst underway, the sudden power draw on the hydraulics motor can have a disturbing effect on the drive system of the vehicle 10. It may therefore be advisable, by means of an accumulator charging valve (not shown), to provide and preload a suitably large hydraulic accumulator (not shown), which then supplies the requisite hydraulic fluid for the suspension system 22. In such a case the load-sensing device 146 could be dispensed with, since sufficient hydraulic fluid would be constantly available.

On wheeled loaders it is usual for their arm suspension to be switched on or off as a function of the speed of the vehicle, the suspension being switched off (deactivated) on reaching a certain speed limit. This is advisable, since when underway no precise movements have to be performed. Implementation on a telescopic loader is somewhat different, since here a distinction has to be made between pure transporting overland with a trailer, transporting in order to move a load a few meters from A to B, and pure loading operations. It is therefore advisable to incorporate three different axle suspension modes:

Pure loading, lifting and digging work: The suspension system 22 is deactivated and the hydraulic cylinders 18, 20 are fixed.

Short journeys transporting a load from A to B: The suspension system automatically shuts off below a specific speed of travel and switches back on automatically above a specific speed of travel.

Long transporting journeys overland with a trailer. The suspension system 22 is constantly activated and only shuts off if the system detects a critical load state.

The constant activation of the suspension system many be advisable for longer transporting journeys, since at traffic lights, cross-roads and junctions, for example, no power is being drawn from the engine for activation of the suspension system 22, whilst the entire power output can be used for acceleration of the vehicle 10 and for drawing the trailer.

In order to further suppress rolling movements and to increase the stability of the vehicle 10, it is feasible to fix the actually floating rear axle 16 of the vehicle 10. It might be advantageous here for the design of the front axle 14 to be substantially simplified in certain aspects. For example, roll stabilization could be dispensed with. A disadvantage here, however, would be that in this event load cases and hence stresses and deformations would act on the frame 12, which would constitute a considerable and above all an unusual loading. A considerable reinforcement and hence redesigning of the frame 12 would be necessary. Even damping the oscillating movements of the rear axle 16 would also produce this effect. Although the load stresses would not be as great as with an immobile fixing, reinforcements to the existing frame construction would also be necessary here.

Hydraulic accumulators 36, 40 must be safeguarded against overpressures in accordance with a directive on pressure vessels, which is why the exemplary embodiments represented with reference to FIGS. 1 to 6 comprise a pressure relief valve (not shown) on the hydraulic accumulators 36, 40. Since this, like a pressure release valve for releasing the pressure prior to servicing work, is not important for the functional working, it has not been included in the figures.

In each of FIGS. 2 to 5 a hydraulic accumulator 36, 40 has been drawn in on each hydraulic cylinder 18, 20. It is readily feasible, however, to provide more than one hydraulic accumulator 36, 40, which may be provided with different preloading pressures, in order to exploit the advantages of a 'variable springing rate' for the suspension system 22.

Having described the preferred embodiment, it will become apparent that various modifications can be made without departing from the scope of the invention as defined in the accompanying claims.

The invention claimed is:

1. A suspension system for an agricultural or construction industry vehicle having a first and a second hydraulic cylinder, which support a frame of the vehicle in relation to an axle of the vehicle, the hydraulic cylinders each having a piston-side chamber and a piston rod-side chamber and the hydraulic cylinders being hydraulically connected to one another in a cross connection via a first connecting line and a second connecting line, so that the piston-side chamber of the first hydraulic cylinder is connected to the piston rod-side chamber of the second hydraulic cylinder and vice versa, having a first hydraulic accumulator arranged in the first connecting line and having a second hydraulic accumulator arranged in the second connecting line, having a hydraulic source, having a hydraulic tank, having a control valve device, having an electronic control unit, having electrically switchable switch valves which are arranged in the first and second connecting lines between the hydraulic accumulators and the chambers of the hydraulic cylinders, and a first and second supply line, which supply lines connect the control valve device to the connecting lines, with the one supply line opening out into the one connecting line between the switch valves of the one connecting line, and the other supply line opening out into the other connecting line between the switch valves of the other connecting line, wherein a means for detection and compensation of load states of the vehicle are provided in the suspension system.

2. A suspension system according to claim 1 wherein the means for the detection and compensation of load states comprise pressure transducers and means for registering the position of a pressure transducer, the pressure transducers in each case being arranged between the piston-side and piston rod-side chambers of each of the hydraulic cylinders.

3. A suspension system according to claim 2 wherein the area ratio of the pressure-generating areas in the chambers of a pressure transducer essentially corresponds to the area ratio of the pressure-generating areas in the chambers of a hydraulic cylinder.

4. A suspension system according to claim 2 wherein the means for registering the position of a pressure transducer comprises one of a switch or sensor.

5. A suspension system according to claim 1 wherein the means for the detection and compensation of load states comprises pressure sensors, which serve to register the pressure in the individual chambers of the first and second hydraulic cylinders.

6. A suspension system according to claim 1 wherein the means for the detection and compensation of load states comprises pressure switches, which are in each case connected to one of the rod-side chambers of the hydraulic cylinders.

7. A suspension system according to claim 1 wherein the means for the detection and compensation of load states comprises force sensors, which serve indirectly or directly to detect forces acting on the hydraulic cylinders.

8. A suspension system according to claim 1 wherein the switch valves have a flow position and a closed position, the closed position comprising a non-return valve opening in the direction of the chamber.

9. A suspension system according to claim 1 wherein the switch valves have a throughflow position and a closed position, which closes in both directions, and are connected in parallel with a non-return valve which opens in the direction of the chamber.

10. A suspension system according to clam 1 wherein the supply or connecting lines are provided with pressure switches.

11. A suspension system according to claim 1 wherein the control valve device comprises a first admission line opening into the one supply line and a second admission line opening into the other supply line and a first discharge line opening into the one supply line and a second discharge line opening into the other supply line, the admission lines being connectable via admission control valves to the hydraulic pump or the hydraulic tank and the discharge lines being connectable via discharge control valves to the hydraulic tank.

12. A suspension system according to claim 11 wherein the admission control valves and the discharge control valves comprise switch valves.

13. A suspension system according to claim 11 wherein the admission control valves and the discharge control valves comprise proportional valves.

14. A suspension system according to claim 11 wherein a load-sensing device is provided, which registers a pressure in one of the first or second admission line.

15. A suspension system according to claims 11 wherein the admission lines are provided with a non-return valve opening in the direction of the supply lines.

16. A suspension system according to claim 11 wherein the discharge lines are provided with one of a restrictor or orifice.

17. A suspension system according to claim 11 wherein the discharge lines are provided with a proportional discharge control valve.

18. A suspension system according to claim 1 wherein the piston-side and the piston rod-side chambers of the hydraulic cylinders are each provided with a resettable non-return valve, the non-return valve opening in the direction of the respective chamber.

* * * * *